United States Patent
Berk

(10) Patent No.: US 8,929,522 B2
(45) Date of Patent: *Jan. 6, 2015

(54) SYSTEM AND METHOD TO CUSTOMIZE A CONNECTION INTERFACE FOR MULTIMODAL CONNECTION TO A TELEPHONE NUMBER

(71) Applicant: Marchex, Inc., Seattle, WA (US)

(72) Inventor: Matthew Berk, Seattle, WA (US)

(73) Assignee: Marchex, Inc., Seattle, WA (US)

( * ) Notice: Subject to any disclaimer, the term of this patent is extended or adjusted under 35 U.S.C. 154(b) by 147 days.

This patent is subject to a terminal disclaimer.

(21) Appl. No.: 13/677,248

(22) Filed: Nov. 14, 2012

(65) Prior Publication Data

US 2014/0133639 A1    May 15, 2014

(51) Int. Cl.
*H04M 11/00* (2006.01)
*H04M 3/42* (2006.01)

(52) U.S. Cl.
CPC ...... *H04M 3/42263* (2013.01); *H04M 3/42382* (2013.01); *H04M 2201/42* (2013.01)
USPC .................................. 379/93.05; 379/90.01

(58) Field of Classification Search
USPC ...................... 379/93.05, 93.01, 90.01, 93.17
See application file for complete search history.

(56) References Cited

U.S. PATENT DOCUMENTS

| | | | |
|---|---|---|---|
| 8,433,048 B2 * | 4/2013 | Berk | 379/114.13 |
| 2007/0094073 A1 * | 4/2007 | Dhawan et al. | 705/14 |
| 2009/0199114 A1 * | 8/2009 | Lewis et al. | 715/763 |
| 2011/0320277 A1 * | 12/2011 | Isaacs | 705/14.55 |
| 2013/0073395 A1 * | 3/2013 | Rincon et al. | 705/14.66 |

* cited by examiner

*Primary Examiner* — Stella Woo

(74) *Attorney, Agent, or Firm* — Perkins Coie LLP

(57) ABSTRACT

A system and method for customizing a connection interface that is displayed to a user and provides multiple modes for the user to connect to a telephone number. The multimodal connection interface may be triggered by a GUI event, such as the user selecting or pointing to a telephone number in a displayed web page. The connection interface provides multiple options for the user to connect to the phone number, such as by mobile phone or computer. In some embodiments, the system uses advertiser-defined rules to present a connection interface that includes additional details about the advertiser that is associated with the telephone number. In some embodiments, the system uses publisher-defined rules to present a connection interface that includes information about the advertiser as well as other related businesses.

21 Claims, 12 Drawing Sheets

SYSTEM AND METHOD TO CUSTOMIZE A CONNECTION INTERFACE FOR MULTIMODAL CONNECTION TO A TELEPHONE NUMBER

BACKGROUND

Convergence in technology has started to erase distinctions between devices such as the computer, telephone, television (TV), media player and the like, so that the functionalities of once separate devices are now combined into a single device. For example, it is not uncommon today for people to access the Internet using a TV and to watch televised content on a personal computer (PC). As another example, emails can be sent with a smart phone and phone calls can be made from a PC. While merging technologies afford end users greater accessibility to electronic content and additional channels of communication, the process by which a business tracks its interaction with consumers (i.e., end users) via these electronic devices is made more difficult by the variety of devices and the various connection channels that can be established by each device.

A business aims to maximize its marketing dollars by buying effective advertising that successfully reaches a target consumer and ultimately leads to the purchase of its goods and/or services. Multifunction devices enable users to switch between online and offline marketing channels with ease and thus compromise the ability of a business to determine the efficacy of its advertising campaigns across the channels. For example, website and search engine analytics attempt to measure the performance and effect of online advertising. However, when a user transitions from one form of interaction (e.g., browsing the web) to another form (e.g., making a phone call), the ability to effectively gauge an advertisement's success and to ultimately gain useful lead intelligence is lost.

Call-tracking telephone numbers attempt to bridge the gap by tracking user interactions with advertisements (ads), regardless of whether the interaction is online (e.g., web-based) or offline (e.g., telephonic, person-to-person). A call-tracking number (CTN) is a specific phone number that is not tied to a particular location or phone, but is linked to a company for the purpose of tracking a unique advertising campaign. However, using CTNs to perform call tracking is not only costly, but also unreliable. For example, CTNs are often re-used too quickly after they are retired from a previous campaign and thus incoming calls may be a result of obsolete advertisements. Old advertising campaigns can lead to undesirable incoming calls to the CTN and therefore skew the performance analysis of advertising campaigns. Further, the quarantining of recycled CTNs requires businesses to purchase and stockpile unused CTNs for long periods of time. As such, in an environment of changing technologies and communication channels, the ways in which a business measures the efficacy of its advertising campaign also need to evolve.

The need exists for systems and methods that overcome the above problems, as well as provide additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
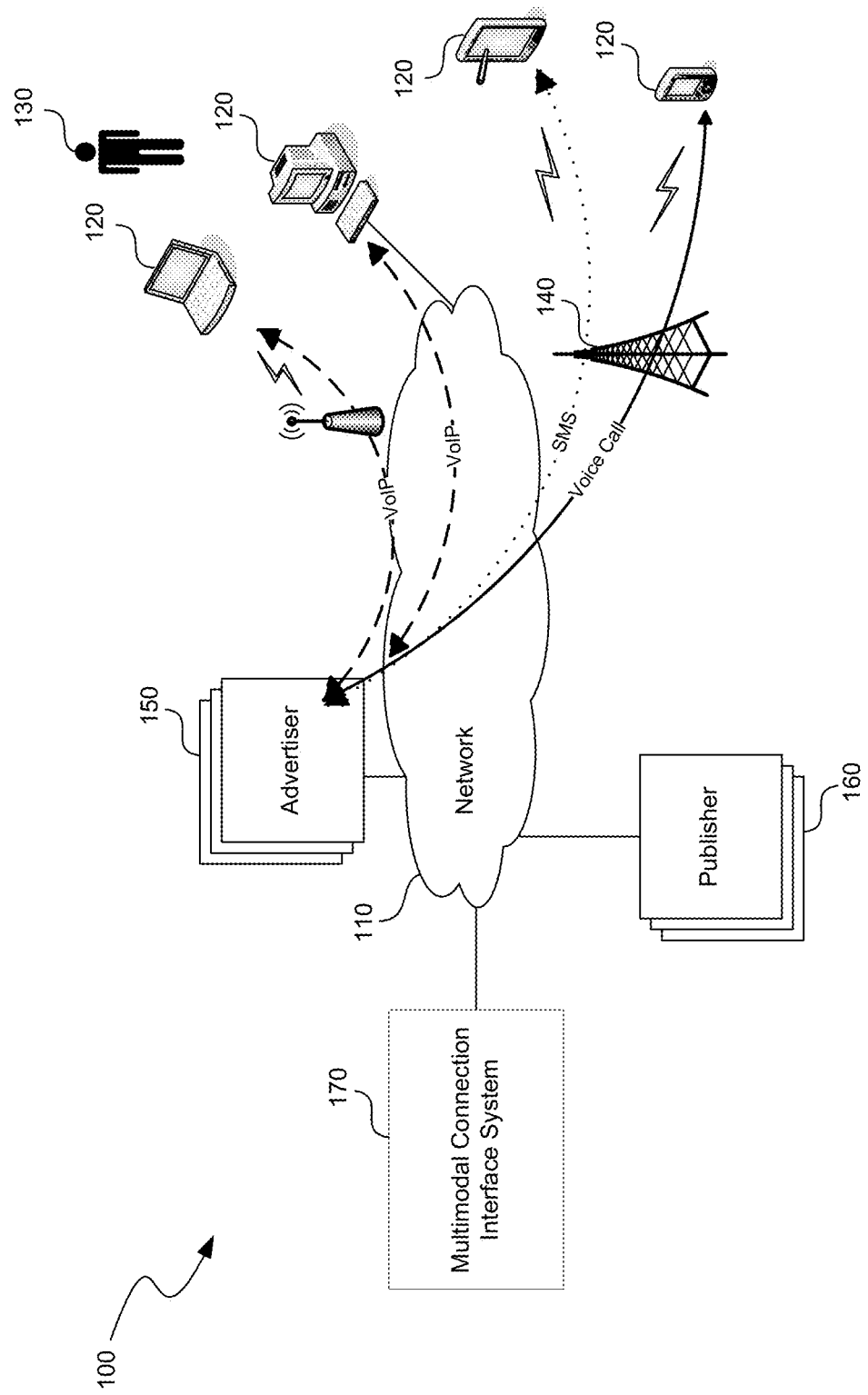
FIG. 1 is a block diagram illustrating an environment in which a multimodal connection interface system operates in some embodiments.

A system and method for displaying a graphical user interface (referred to herein as a "multimodal connection interface") that allows users to connect to a telephone number displayed in electronic content through one of many different modes of communication, is disclosed. The multimodal connection interface system allows an entity (e.g., a business, advertiser, publisher, third-party aggregator, etc.) to tailor the way information is presented to users on the multimodal connection interface. The system allows an entity to specify the number of modes through which a user can contact the displayed number, and to customize the interaction with users via the selected mode of communication to the displayed number.

Businesses benefit from the multimodal connection interface system as it not only allows users the ability to act upon instances of telephone numbers displayed in electronic content, but it also makes telephone numbers actionable in a way that is trackable. The multimodal connection interface tracks the channels that users use to contact the business or other entity associated with a displayed telephone number—all without a CTN. Using only the designated telephone number displayed on the webpage, the system can track, record, forward, and account for details of all communication sessions generated from the connection interface. Tracking the communication sessions eliminates the need to maintain several CTNs directed to various internet marketing mediums, as well as the costs, maintenance, and uncertainty associated with CTNs.

It will be appreciated that consumers also benefit from the multimodal connection interface system. From a consumer's perspective, shoppers frequently look for a retailer or service provider through an Internet search engine. Search engines typically generate a results page that includes a hyperlink to the retailer's or service provider's web page. While general information is readily available on a business's webpage, many shoppers still prefer to gather purchase information on the phone or interact with live personnel. The multimodal connection interface facilitates a user's ability to contact a business or entity through a preferred method of connection using the same medium (i.e., a communications channel such as the Internet) as the displayed phone listing of interest.

Various embodiments of the invention will now be described. The following description provides specific details for a thorough understanding of, and enabling description for, various examples of the technology. One skilled in the art will understand that the technology may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Illustrative Environment

FIG. 1 is a block diagram illustrating a representative environment 100 in which a system 170 for generating a multimodal connection interface operates. In FIG. 1, a multimodal connection interface system 170 is coupled to an electronic device 120 via a network 110. The network 110 is any public or private network suitable for communicably coupling the multimodal connection interface system 170 to an electronic device 120, advertiser 150, and/or publisher 160, via wireless, wired, and/or other suitable connection. As indicated by the arrows in FIG. 1, network 110 enables electronic devices 120 to be communicably coupled to an advertiser 150, via a Voice over Internet Protocol (VoIP) network, a cellular telecommunications network 140, any combination of these networks, or any other suitable network that can support communication capabilities (e.g., video conferencing, instant-messaging, Short Message Service (SMS) applications). The electronic device 120 includes any type of electronic device that is capable of displaying a telephone number to a user 130 and initiating a telecommunications session via that telephone number. An electronic device 120 can therefore include, but is not limited to, devices such as computers (e.g., laptops, desktops), mobile phones, smart phones, personal digital assistants (PDAs), tablet computers, media players, game devices, and/or other suitable devices.

The multimodal connection interface system 170 is also communicably coupled to one or more advertisers 150 and one or more publishers 160. As used herein, the term "advertiser" is intended to refer to any entity that provides a telephone number to the multimodal connection interface system 100, and does not merely refer to an entity that advertises goods, services, and/or other items. Accordingly, advertisers 150 include businesses (e.g., retailers, manufacturers, service providers, etc.), governments, administrative agencies, as well as individual persons. The term "publisher" is intended to refer to any entity that provides web content and/or applications. Accordingly, publishers 160 include server publishers that specify the contents and layout of a web page such as Yelp.com®, Citysearch.com®, and Yellowpages.com®, as well as client publishers that provide web browsing abilities, such as Internet Explorer®, Firefox®, and Google Chrome®, and any corresponding add-on applications (e.g., toolbars) that integrate browser features and functionalities.

Figure 2:
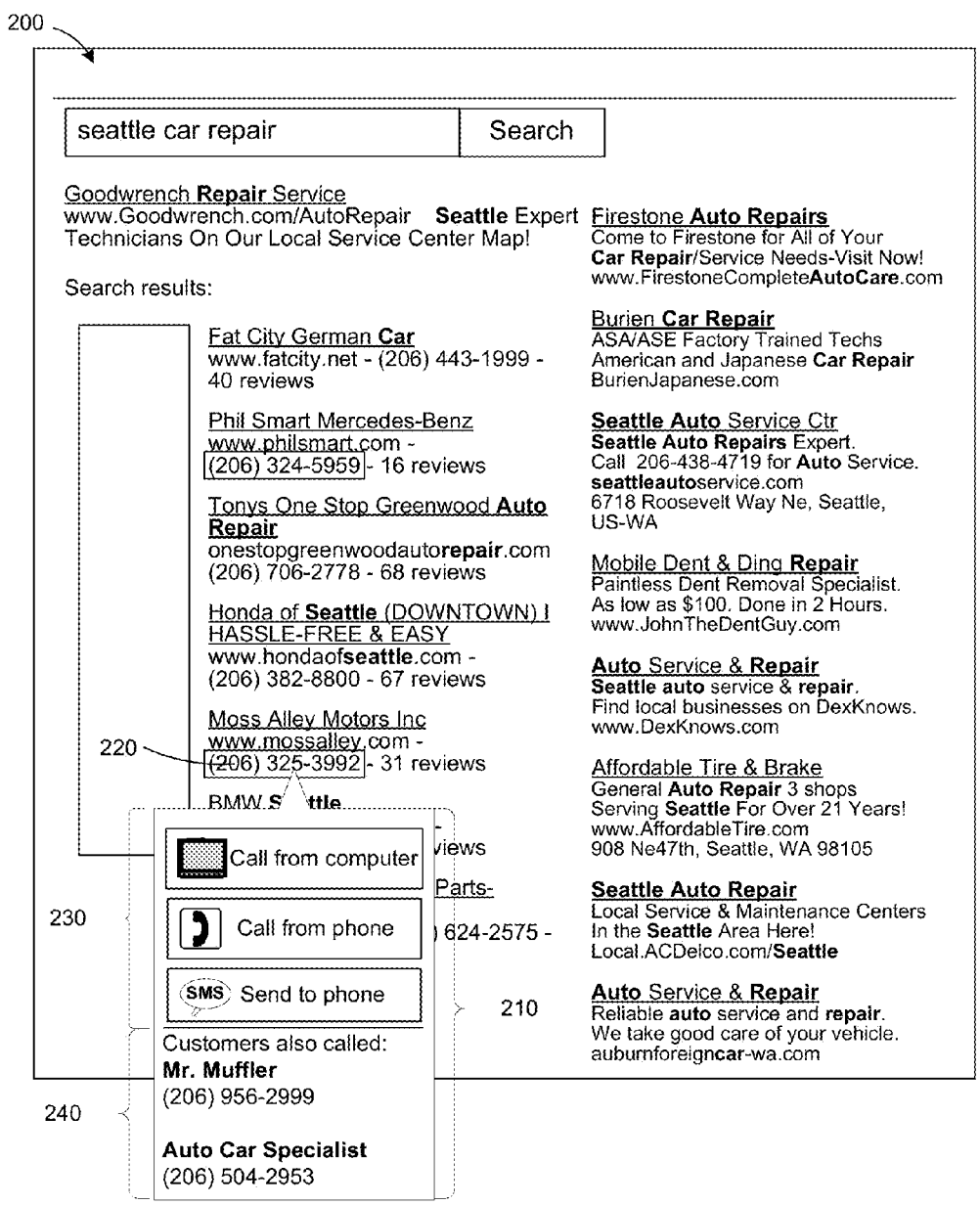
FIG. 2 illustrates an example of a simple multimodal connection interface to a telephone number that has been displayed in electronic content.

As described in more detail herein, the system enables a user to connect to a telephone number displayed in electronic content through one of many different modes of communication via a multimodal connection interface. An example of a simple multimodal connection interface displayed within electronic content is shown in FIG. 2. When electronic content 200 includes a telephone number 220, a multimodal connection interface 210 may be triggered upon user interaction with the displayed telephone number 220. In some instances, the electronic content 200 is a web page that is accessed through a client publisher. In other instances, electronic content 200 includes documents, spreadsheets, emails, instant messages, pop-up advertisements, or other items capable of including or displaying telephone numbers. FIG. 2 shows a web page listing the results of an internet search as a representative context in which a multimodal connection interface 210 can be displayed. When a user points to or select a telephone number listing 220, the user's action triggers the display of the multimodal connection interface 210 by the system on the electronic device.

The content and format of the connection interface can be customized based on predefined rules that are maintained by the system. As will be described in additional detail herein, the rules that determine when the multimodal connection interface is displayed and the content of the connection interface may be specified by an advertiser, publisher, user, or system administrator. For example, an advertiser can define rules on how connection mode options 230 are presented to a user, what connection modes are available, along with what additional information 240 should be included in the multimodal connection interface 210.

Illustrative System

Figure 3:
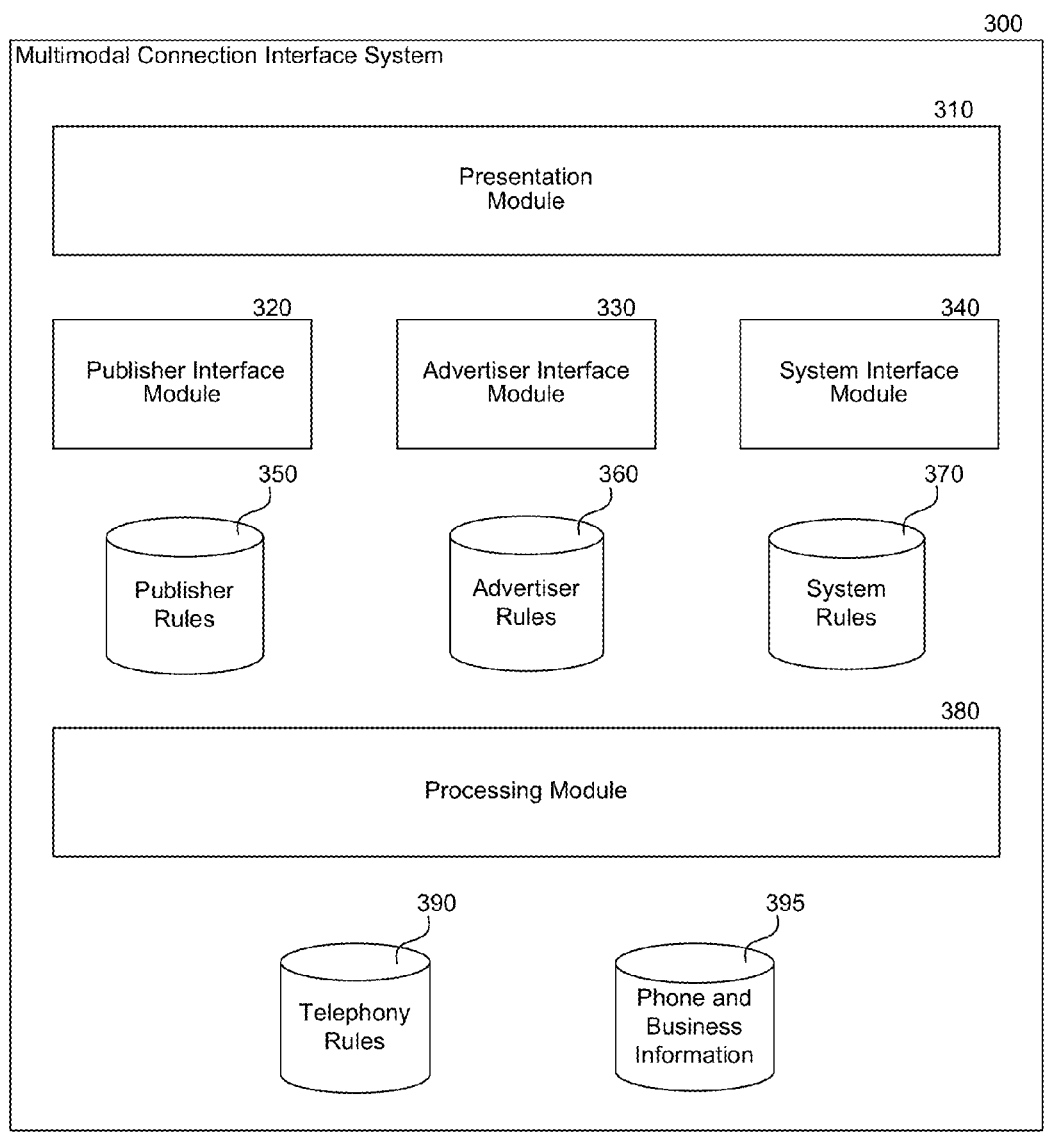
FIG. 3 is a block diagram of the multimodal connection interface system for customizing a connection interface that enables connection to a telephone number using different modes.

FIG. 3 is a block diagram illustrating the multimodal connection interface system 170 in more detail. The system comprises various datasets and modules, which in combination perform the functions that generate the multimodal connection interface shown in FIG. 2. Some of the system's datasets include rules that delineate requirements, definitions, or attributes of a particular aspect of the system. Rules may pertain to or be specified by an advertiser, publisher, user, or system administrator. Given the number and the different types of rules that exist within the system, the various permutations give rise to a number of interrelated interactions and sometimes, dependencies between these rules. In some embodiments, the multimodal connection interface system 170 therefore imposes a analysis scheme that prioritizes the rules—as between the different types of rules (i.e., publisher, advertiser, user, system) and within the same type of rule. Although the following descriptions describe example embodiments, details may vary considerably in a specific implementation, while still being encompassed by the invention disclosed herein.

Referring to FIG. 3, the multimodal connection interface system 170 includes a dataset of publisher rules 350 and a dataset of advertiser rules 360. In one embodiment, a look-up table is used to access the information contained within datasets (e.g., 350, 360, 370). For example, the dataset of advertiser rules 360 can associate a telephone number with the contextual information related to the telephone number and/or web page wherein the telephone number is displayed (and other information, if any), such that the telephone number can be used as a key to retrieve the corresponding information. Other references besides the telephone number may be used to retrieve corresponding information, such as advertiser or publisher name, web address, connection mode, etc.

As previously described, the content and format of the multimodal connection interface can be customized based on predefined rules specified by an entity, such as an advertiser or publisher. Advertisers can customize various attributes of the multimodal connection interface, such as by allowing the advertiser to specify the information and options presented in the multimodal connection interface. For example, advertiser rules can specify how the interface is visually rendered (e.g., font, colors, design, animation), what is rendered (e.g., text, image, icon), what functionalities are enabled (e.g., present a logo, display call-hold times), along with what connection options (e.g., call from PC, call from phone, send to phone) are available and/or presented to the user. Advertiser rules can also specify that the multimodal connection interface include additional information related to the advertiser. For example, the multimodal connection interface can include information about location, distance, discounts, promotions, ratings, reviews, directions, business hours, hyperlinks to additional information (e.g., map, frequently asked questions, product information), and the like. Moreover, information relating to a user's social network can be included, such as reviews by friends or the number of friends who have contacted the advertiser. Advertiser rules can further specify that additional features be included on the multimodal connection interface, such as scheduling a date and/or time of a communication session with the advertiser (e.g., a customer service call, visit, reservations, or appointments). In some embodiments, the system 170 allows an advertiser to prioritize the implementation of its rules, so that certain rules will take priority over other rules when conditions are imposed on the connection interface by the user, system administrator, or publisher.

Similarly, a publisher can customize various attributes of the multimodal connection interface. As previously described, publishers include both server publishers and client publishers such that the electronic content displayed by a publisher encompasses a wide variety of subjects. Moreover, content displayed by a publisher may include multiple advertisers in the same piece of content that is displayed to a user. As a result, publisher rules can include rules that relate to an individual advertiser and rules that apply to multiple advertisers whether displayed individually or collectively. For example, in certain circumstances the electronic content displayed by a publisher includes multiple advertisers. In such a scenario, the publisher may prefer to display identical or similar multimodal connection interfaces to allow for uniformity in display. In such instances, the publisher therefore define rules standardizing or imposing constraints on the appearance, functionality, connection options of the interfaces, across multiple advertisers. In contrast, when only a single advertiser is displayed on a piece of electronic content published by the publisher, the publisher may opt to allow the connection interface to be defined by the format and functionality that is desired by the advertiser.

In some embodiments, a publisher may confer special benefits to select advertisers. For example, when a user conducts a search query, the select advertisers may obtain, for example, premium ad placement on the publisher's web page or a preferred listing position among search results. In such instances, a publisher may present to a user one type of a multimodal connection interface that includes robust information about the advertiser of interest. For the non-select advertisers, however, the publisher may elect to display a reduced or minimal form of connection interface.

Referring to FIG. 3, the multimodal connection interface system 170 also includes a dataset of system rules 370, comprised of user rules and administrator rules of the system. Administrator rules are defined by the system operator and relate to policies, procedures, and the management of the multimodal connection interface system. For example, administrator rules can define a default rule if a certain advertiser, publisher, user, telephony, etc. rule is not defined or established. As another example, administrator rules can determine what data should be extracted from the contents of a web page displaying the telephone number, such as telephone numbers and other information for establishing the context of the telephone number. Likewise, administrator rules can define the triggers or tags that cause an identified telephone number to be (automatically) detected and/or highlighted in electronic content. Administrator rules can also establish whether a particular telephone number is enabled for use with a multimodal connection interface.

In addition, administrator rules can be used to manage a compensation arrangement through which certain entities are compensated whenever a user contacts an advertiser via the multimodal connection interface. Any user contact or interaction with an advertiser represents a lead that can potentially be converted into a sale of the advertiser's goods and/or services. Thus, advertisers are willing to compensate a publisher, administrator, or other party for facilitating the connection. For example, every time a user calls Advertiser 1 via a multimodal connection interface displayed on Publisher P's web page, Publisher P is compensated by Advertiser 1. Similarly, Administrator A may be compensated every time Administrator A routes a user's call to Advertiser 1. In turn, administrator rules can be used to manage a compensation arrangement and specify, for example, what telephone numbers have an associated compensation arrangement, what is the compensation arrangement, what entities (e.g., publishers, administrators) are to be compensated, along with what advertisers having an associated compensation arrangement may be recommended, highlighted, etc.

The dataset of system rules 370 also includes user rules that define a configuration, setting, or preference associated with a user of the multimodal connection interface system. User rules can include any information identifying the user including account or profile information and activity history. As an example, the user's call and search history can be synchronized and mined for information such as frequent contacts and latest search queries, which can then be stored as a user rule to predict or shortcut future actions. User rules can also specify preferences relating to the display of telephone number(s), the display of the multimodal connection interface, the options presented on the multimodal connection interface, and the like. For example, user rules can direct the system to highlight all, none, or a selection of telephone numbers for use with a multimodal connection interface. User rules can also specify connection preferences such as how a user connects to an advertiser and/or through what service provider. In addition, user rules can disable certain connection options (e.g., call from PC, send to phone), or specify a preferred telephone number at which an advertiser can reach the user. As another example, user rules can specify a preferred mode of contact, or a certain date/time at which to schedule a call from the advertiser.

Referring to FIG. 3, the multimodal connection interface system 170 further includes a presentation module 310 that causes the customized multimodal connection interface to be displayed to the user. The presentation module 310 applies the rules (e.g., advertiser, publisher, user, administrator rules, etc.) to the content that is, or will be, displayed to the user to define interface parameters. In one embodiment, these interface parameters are transmitted to the electronic device and the electronic device formulates the multimodal connection interface. In another embodiment, the presentation module 310 makes use of the interface parameters to formulate the multimodal connection interface, which is then transmitted to the user's electronic device.

Referring to FIG. 3, the multimodal connection interface system 170 also includes a dataset of telephony rules 390 for defining the connection parameters that configure a communication session between an advertiser and a user. Telephony rules specify the various functions and features of the communication path between the advertiser and the user when the connection is made. Telephony rules can be defined by an advertiser, publisher, or administrator.

In some embodiments, telephony rules are defined in terms of connection mode. For example, whenever a user selects an option on the multimodal connection interface to communicate via SMS, a publisher can define a telephony rule that requires two text messages to be sent to the user. The first text message lists the advertiser's telephone number included in the publisher's web page and the second text message includes additional information about the advertiser, such as a map link, address, similar businesses, or social networking activity. Further, telephony rules can be defined to automatically: record the voice call, insert a call whisper, send an accompanying email, include business address or other information, change message, connect to an IVR system, connect a call for free, meter for or bill a certain entity for the connection, etc. In addition, telephony rules can specify the routing of a connection based on, e.g., time of day, where the user is connecting from, where the user wants to connect, first connecting to a conditional IVR, whether the user's telephone number ought to be blocked or filtered out, etc.

Referring to FIG. 3, the multimodal connection interface system 170 also includes a dataset of phone and business information 395. The dataset of phone and business information 395 is an organized directory of telephone numbers, business names, and other information such as physical address, web address, business hours, reviews, affiliated compensation arrangement, and the like. The dataset 395 also contains information relating to the associations between each data item. For example, there may be a case where a single business has more than one telephone number or a single telephone number refers to more than one business. Those skilled in the art will appreciate that the dataset 395 may be structured or organized in a variety of ways.

The multimodal connection interface system 170 also includes various interface modules. The advertiser interface module 330 generates an interface that allows an advertiser to define and manage advertiser rules and telephony rules that are applicable to that advertiser. The advertiser interface module 330 enables advertisers to directly (e.g., via a web portal provided by the system) or indirectly (e.g., via a sales representative that utilizes the interface on behalf of the advertiser) to specify the advertiser rules and telephony rules that configure aspects of the multimodal connection interface. The publisher interface module 320 generates an interface that allows a publisher to define and manager publisher rules, including telephony rules and rules related to a specific advertiser. The publisher interface module 320 enables a publisher to directly (e.g., via a web portal provided by the system) or indirectly (e.g., via a sales representative that utilizes the interface on behalf of the publisher) specify the publisher and telephony rules for configuring the multimodal connection interface.

The system interface module 340 generates an interface through which user rules, administrator rules, telephony rules, and phone and business information can be defined and managed by a system administrator or a user. The system interface module 340 can be accessed by users and administrators; however, users are limited to defining or configuring (aspects of) the user rules. As such, the system interface module 340 allows an administrator to manage one or more rules (i.e., user rules, administrator rules, telephony rules, phone and business information), but allows users to configure user rules. User rules can be defined either directly (e.g., via a web portal provided by the system) or indirectly (e.g., via a publisher).

The multimodal connection interface system 170 further includes a processing module 380. The processing module 380 performs various functions to facilitate the configuration of the multimodal connection interface as disclosed herein. The processing module 380 performs certain steps of the methods or functions described herein, and may include components, subcomponents, or other logical entities that assist with or enable the performance of some or all of these methods or functions. For example, the processing module 380 may include a communications component that is configured and/or programmed to allow communications and data exchange between users of an electronic device with advertisers. The processing module 380 may include a metrics component that tracks such metrics as call length, source of calls, distribution of calls throughout the day or day of the week, destination of calls, etc. The processing module 380 may also include a storage area to store information received, tracked, and generated by the multimodal connection system. The processing module 380 can also include other components (not shown), such as components that charge or bill entities in accordance to a compensation arrangement for connecting/routing calls, components that route a telephone call to or from a user to an advertiser telephone number, and the like.

The components and modules described in FIG. 3 and elsewhere herein may comprise software, firmware, hardware, or any combination(s) of software, firmware, or hardware suitable for the purposes described herein. Software and other components may reside on servers, workstations, personal computers, and other devices suitable for the purposes described herein.

Those skilled in the art will appreciate that the multimodal connection interface system may be implemented on any computing system or device. Suitable computing systems or devices include personal computers, server computers, handheld or laptop devices, multiprocessor systems, microprocessor-based systems, programmable consumer electronics, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical-based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

Illustrative Processes

Figure 4A:
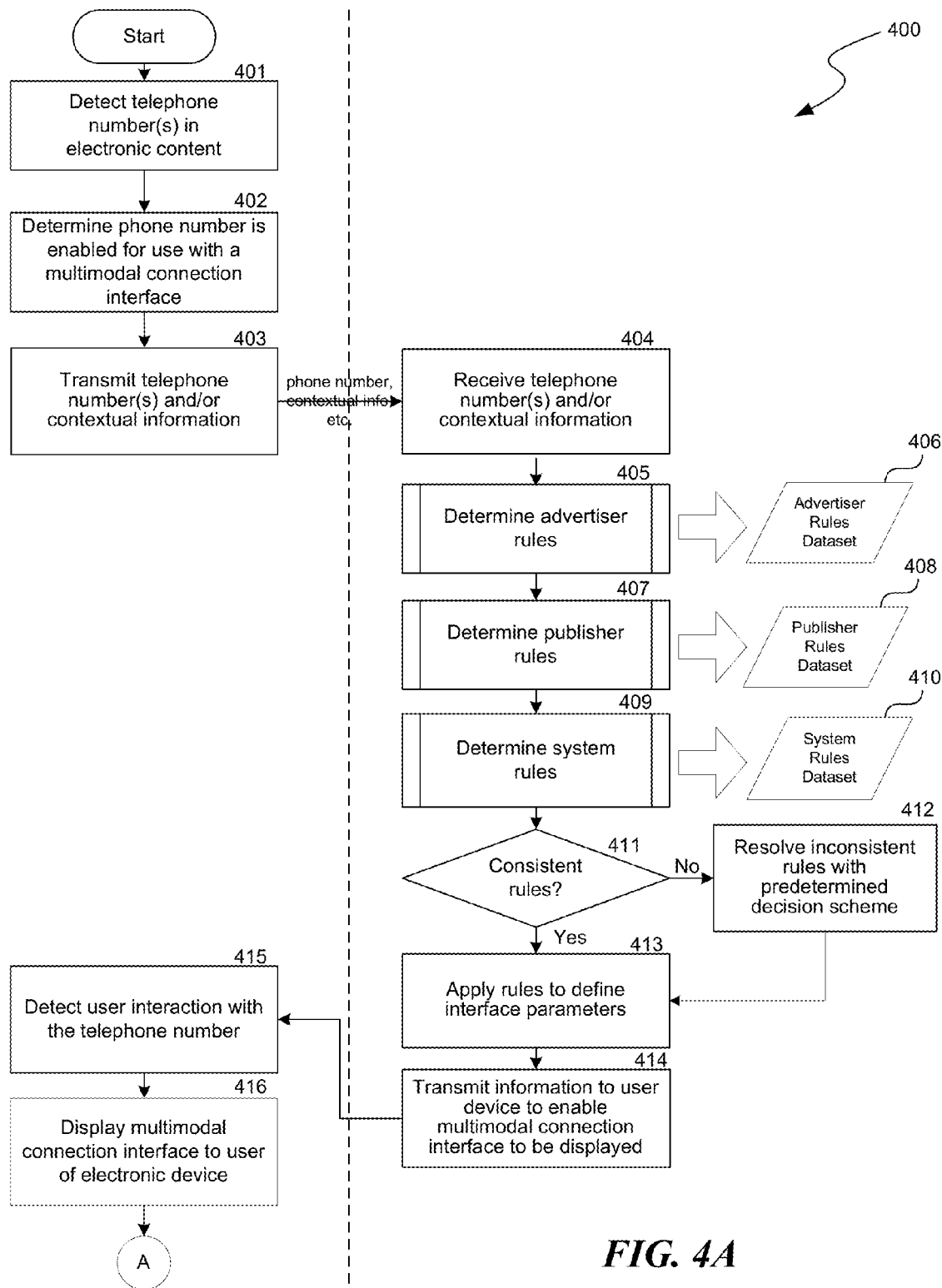
FIG. 4A is a flow diagram illustrating a process by which the system defines interface parameters.

FIG. 4A is a flow diagram illustrating a process 400 by which the system 170 defines interface parameters for the multimodal connection interface. The process begins at block 401, whereby an electronic device, having an application that enables a user to peruse electronic content on the device, detects one or more telephone numbers in the electronic content.

In some embodiments, telephone numbers are tagged or otherwise marked by a server publisher, such as Yelp.com®, Citysearch.com®, or Yellowpages.com®, such that a browser or other application that displays a telephone number is able to easily interpret the displayed digits as a telephone number. In such instances, telephone numbers are denoted, tagged, or otherwise marked-up using a mark-up language (e.g., XML) and the web page is parsed so as to detect these telephone number identifiers. The entirety of the web page may also be analyzed for any information that establishes the context of the telephone number and/or the web page in which the telephone number is displayed. In addition to marking the telephone number, the associated web page may also contain code which causes the process to display the multimodal connection interface described herein to be automatically initiated.

In some embodiments, the telephone number is detected by a web browser or other application of a client publisher, such as Internet Explorer®, Firefox®, or Google Chrome®. In such instances, the telephone number and any contextual information may be detected by, for example, a web browser, an executable program that works in conjunction with the web browser (e.g., a plug-in, add-on, extension), or any stand-alone application that allows a user to peruse content and establish communication sessions. A telephone number is detected by searching for a string of digits in a sequence that is typically associated with a phone number in the jurisdiction associated with the displayed content (e.g., a numeric sequence with an area code and seven digit local number, like "206-555-1212," in the United States). When a possible telephone number is detected, all data corresponding to the telephone number, including the actual number and any contextual information (e.g., cookies, URL, domain name, session identifier, publisher identifier) can be identified and extracted.

The detection of a possible telephone number may cause the electronic device to display an indication to the user that additional functionality is available for the telephone number. The telephone number and/or any text (e.g., "call") or graphics (e.g., phone icon) associated with the telephone number may be highlighted, animated, displayed in another color, underlined, bolded, etc. (As used herein, the telephone number and any associated text or graphics will be collectively referred to as the "telephone number.") In this context, the term "highlighting" denotes any graphical, textual, visual, haptic, or auditory technique used to indicate that a multimodal connection interface is enabled for use. The type of highlighting used may be determined by the electronic device or the multimodal connection interface system. Similarly, a cursor's appearance may change in order to indicate the availability of additional functionality for the telephone number.

At block 402, the electronic device transmits the one or more telephone numbers detected in the electronic content and optionally any contextual information to the multimodal connection interface system 170. At block 403, the multimodal connection interface system 170, receives the one or more telephone numbers and any transmitted contextual data. The electronic device may transmit, and the multimodal connection interface system may receive, all or some of the telephone numbers that are displayed on the web page. Any contextual information related to the telephone number and/or the web page wherein the telephone number is displayed may also be transmitted/received. As an example, the URL of the web page, which includes information relating to the web page the user was currently viewing as well as any root level information relating to a web page the user had viewed or a host or domain name may be transmitted/received. As another example, transmitted/received data can include metadata describing the contents of the web page such as the publisher, keywords, page description, language, dates, etc. In addition, a session identifier that identifies a specific user interaction with a web page may also be transmitted/received. Those skilled in the art will recognize that contextual information transmitted to/received by the multimodal connection interface system may also include additional information not otherwise detailed herein.

At decision block 404, the system 170 determines whether a multimodal connection interface is enabled. The system may determine whether a multimodal connection interface is enabled simply based on the telephone number. For example, the system performs a look-up operation to determine whether a multimodal connection interface is enabled for use with the telephone number. In such instances, the system may, for example, refer to a look-up table stored in a dataset such as the phone and business information dataset 395 or system rules dataset 370. Alternatively or additionally, the system may determine whether a multimodal connection interface is enabled based on the telephone number and contextual information related to the telephone number and/or the web page wherein the telephone number is displayed.

Alternatively or additionally, the system 170 may determine whether a multimodal connection interface is enabled without a telephone number, and solely based on contextual information. In other words, any contextual information (e.g., metadata) that is tagged in a certain way or that can be reliably associated to a telephone number can be used to ascertain if a multimodal connection interface is enabled. As an example, a user may visit the homepage of a national chain of stores and navigate to the webpage of a regional store which is embedded several levels into the national website. The regional store's webpage does not display a phone number, but mentions the availability of customer service representatives. The system can trace back to the root level of the national website or refer to the domain name in order to find an associated telephone number for the customer service representatives. As a result, the regional store's webpage can highlight the text or graphics associated with the reference to customer service and enable users to contact a customer service representative from the regional store's webpage via a multimodal connection interface. As another example, the system may detect the name of a business and perform a search on the business name in order to identify a corresponding phone number for display to a user. As yet another example, the system may detect the name of a product and perform a search on the product name in order to identify the corresponding business and business phone number for display to a user.

Referring to FIG. 4A, when the system 170 determines that a multimodal connection interface is enabled, the process continues to block 405. If, however, the system determines that a multimodal connection interface is not enabled, the process of configuring interface parameters of the multimodal connection interface is bypassed and the multimodal connection interface is not presented to the user.

At blocks 405, 407, and 409, the system determines respectively, the advertiser, publisher, and system rules. Those skilled in the art will appreciate that the process of determining the rules may be performed in parallel or in a different order than depicted.

At block 405, the system determines advertiser rules applicable to the telephone number and/or context by accessing the advertiser rules dataset 406 to look-up advertiser rules. The system may look-up advertiser rules for configuring interface parameters of the multimodal connection interface based on the telephone number, advertiser, or other contextual information. For example, the system determines how to visually render the multimodal connection interface, how many connection options to offer for a certain advertiser, and whether to include additional information related to the advertiser. As another example, the system can determine what functionalities are enabled within the multimodal connection interface, such as displaying an advertiser logo, providing a hyperlink to a map, or presenting social networking information. Such details and functionalities are specified by advertiser rules which customize a multimodal connection interface for an advertiser.

At block 407, the system determines publisher rules applicable to the telephone number and/or context by accessing the publisher rules dataset 408 to look-up publisher rules. The system may look-up publisher rules for configuring interface parameters of the multimodal connection interface based on the telephone number, publisher, or other contextual information. For example, the system determines whether a publisher prefers to standardize the appearance of the multimodal connection interface for each advertiser. As another example, the system determines whether a publisher rule has specified a customized multimodal connection interface that stands-out from the conventional interface for a select advertiser. The system may also determine what businesses are similar to an advertiser of interest and whether there are other advertisers with certain compensation arrangements similar to the advertiser of interest. Such details and functionalities are specified by publisher rules which customize the multimodal connection interface for a publisher.

At block 409, the system determines system rules by accessing the system rules dataset 410. The system may look-up user rules for configuring the interface parameters in accordance to the preferences and settings specified by the user. Alternatively or additionally, the system may look-up administrator rules. For example, the system can determine whether the advertiser has a compensation arrangement (e.g., a price an advertiser is willing to pay per communication with a specified telephone number(s)) with an administrator, publisher, or the like, whether the advertiser wants to substitute a Call Tracking Number (CTN), whether the telephone number has any associated information on cost or revenue or is part of an advertising campaign, etc. In addition to considering the context (i.e., the surrounding content, website, previous actions of the user, etc.) in which the telephone number is displayed, the system may also apply system rules that take into account the environment in which the multimodal connection interface is to be displayed. For example, they system may apply one rule to configure the connection interface if the interface is to be displayed on a touchscreen display in an automobile, a different rule to configure the connection interface if the interface is to be displayed on a user's desktop computer, and still a different rule to configure the connection interface if the interface is be displayed on a television. The complexity, size, coloring, and other characteristics of the interface may be tailored by the system to the environment in which the interface is to be displayed.

At decision block 411, the system 170 determines whether the determined rules are consistent with one another. Given the number of advertiser, publisher, administrator, and user rules that exist within the system, the various permutations give rise to a number of interrelated dependencies and interactions between these rules. There may therefore be incompatible or conflicting rules in some circumstances. In situations with incompatible or conflicting rules, the multimodal connection system 170 determines the priority between the conflicting rules to ensure that the rules can be consistently applied to define the interface parameters.

If the system determines in decision block 411 that the rules are not consistent, the inconsistent rules are resolved with a predetermined analysis scheme at block 412. The system resolves the inconsistent rules by applying a predetermined analysis scheme that, for example, prioritizes certain rules over others. For instance, the predetermined analysis scheme can specify that a publisher rule supersedes all other rules (e.g., advertiser rule, user rule, administrator rule) or that a publisher rule supersedes a specific type of rule (e.g., advertiser rules). In the case when three or more rules are inconsistent, the predetermined analysis scheme may, for example, rank order the rules such that there is a hierarchy of rules. The system may, alternatively or additionally, provide exceptions to the predetermined analysis scheme, which define certain instances that do not conform to the predetermined analysis scheme. The system may also resolve conflicting rules on a case-by-case basis.

An example of resolving an inconsistency between rules, a publisher rule related to a specific advertiser and an advertiser rule that has been specified by that advertiser may define a different set of characteristics for a multimodal connection interface. If the publisher rules standardize the visual appearance of the multimodal connection interface across all advertisers (see e.g., FIG. 4C), and the advertiser rule specifies a unique multimodal connection interface that differs from the one specified by the publisher rule, the rules are not consistent and the inconsistency should be resolved. A predetermined analysis scheme can be applied to resolve the inconsistent rules. The analysis scheme may, for example, prioritize the publisher rule above the advertiser rule so as to achieve uniformity of display in the electronic content. Another predetermined analysis scheme may, for example, prioritize the advertiser rule above the publisher rule such that the advertiser rule overrides the publisher rule, but only as to the multimodal connection interface associated with the specific advertiser.

If, however, a publisher rule allowed an advertiser to individually configure the multimodal connection interface to the advertiser's liking, the publisher rule would not be inconsistent with an advertiser's rules because the publisher rule defers to an advertiser rule. In turn, the system may, for example, refer to the advertiser dataset to determine at least some of the publisher rules. When the rules are determined not to be inconsistent, the respective rules can be used to configure the multimodal connection interface.

At block 413, after the system has resolved any inconsistency between rules, the system applies the (resolved) rules to define the interface parameters. The system applies the various rules (e.g., advertiser, publisher, user, administrator, etc.) and defines the interface parameters to configure the multimodal connection interface. In turn, the interface parameters specify certain attributes relating to the display of the multimodal connection interface on the electronic device. The interface parameters may define attributes such as coordinate position, size, platform-specific information, etc. In some embodiments, a program and script that works in conjunction with the web browser uses the interface parameters to dynamically access and update the content, structure, and style of the electronic content displayed on an electronic device.

At block 414, the system transmits information to the electronic device of the user to enable the multimodal connection interface to be displayed. In one embodiment, the electronic device generates the multimodal connection interface for display in accordance with the interface parameters. In another embodiment, the presentation module 310 applies the defined interface parameters and performs the necessary functions to generate the multimodal connection interface that is then transmitted to the user's electronic device for display. For example, the presentation module determines how the multimodal connection interface is drawn into a target area of a native window. The presentation module may specify how windows, menus, and dialog boxes are formatted, the opacity of a window, etc. The presentation module may also define information such as coordinate position, size, platform-specific information, etc.

At block 415, the electronic device detects user interaction with the telephone number. Those skilled in the art will appreciate that a user can indicate a desired interaction via various input devices and modes of input, such as a mouse, a touch pad, a touch screen, a cursor, voice command, etc. The electronic device awaits an indication that the user has interacted with the displayed telephone number. One example user interaction is a GUI event of selecting the telephone number. The user interaction may be triggered by, for example, depressing a left-hand or a right-hand button on a computer mouse, or tapping on a touch screen. Another example user interaction includes moving to, hovering, or pointing a cursor in a designated area of a GUI. Those skilled in the art will appreciate that other possible indications may be used to detect interaction with the telephone number.

At block 416, the multimodal connection interface is displayed to the user of the electronic device. The electronic device may display the multimodal connection interface in its own native window as, e.g., a smaller, child window of the web browser that overlays and/or hides a part of the electronic content beneath. Although the multimodal connection interface can be displayed adjacent to and/or immediately below the telephone number (or any text or graphics associated with the telephone number) to be contacted, the interface may appear in any other position on the electronic device. Additional examples of the multimodal connection interface are disclosed herein.

Figure 4B:
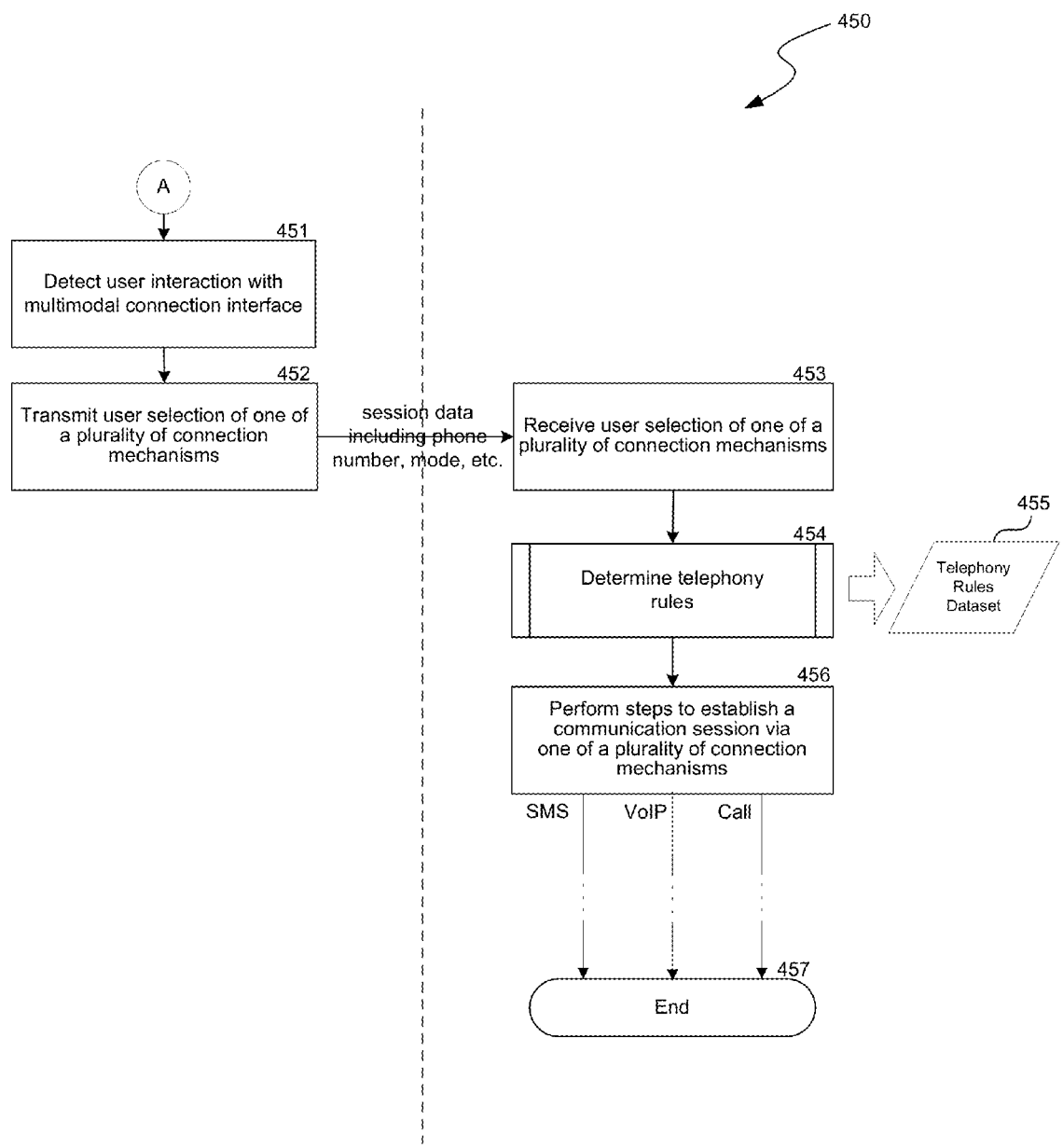
FIG. 4B is a flow diagram illustrating a process by which the system defines connection parameters.

After block 416, the process 400 continues to block 451 in FIG. 4B. Before additional blocks of the flow diagram of FIG. 4 are further described, example multimodal connection interfaces are shown in FIGS. 5A-5C.

Figure 5A:
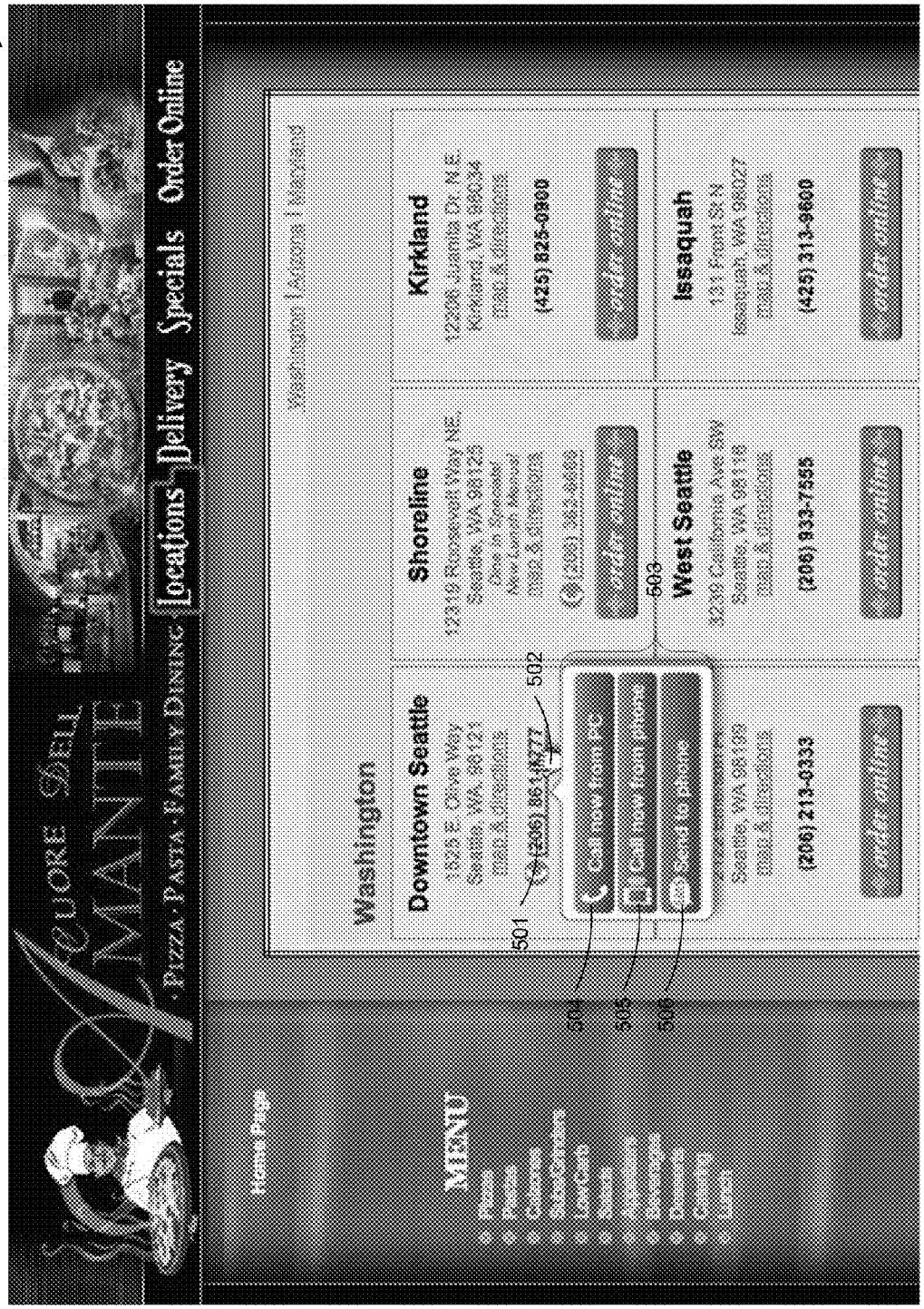
FIG. 5A illustrates an example multimodal connection interface with three connection modes.

FIG. 5A illustrates an example multimodal connection interface 503 on the web page 500 of an advertiser "Cuore Dell Amante." The advertiser operates a number of locations (e.g., "Downtown Seattle," "Shoreline") and provides information for each of its locations on the web page. For each location, the advertiser displays a location name, address information, a hyperlink to map and directions and ordering online, along with a telephone number 501. A highlighted telephone number in some of the location listings indicates the availability of additional functionality. Any interaction (e.g., selecting, pointing, hovering over) with the cursor 502 corresponding to the highlighted telephone number on the part of the user causes the display of the multimodal connection interface 503. In FIG. 5A, the interface 503 provides users the option to "Call now from PC" 504, "Call now from phone" 505, or "Send to phone" 506. As previously discussed, other communication options exist such as call later from a PC or phone, call on a specific date or at a certain time from a PC or phone, send to email, videoconference, and the like. With these options, the multimodal connection interface 503 facilitates a user's contact with the advertiser such that a user can connect seamlessly from the advertiser's web page.

The system may allow for multi-level advertisers to specify different rules depending on level within the advertiser organization. In one implementation, the system allows a national advertiser to define advertiser rules customizing the multimodal connection interface for its nation-wide, toll-free hotline and a regional branch of the national advertiser to define advertiser rules customizing the interface corresponding to its local area telephone number. In another implementation, the system allows the nationwide advertiser to singularly establish the advertiser rules such that there is an identical multimodal connection interface for each regional branch. In another implementation, the regional branch specifies the connection options that are available to a user, but the national advertiser specifies the telephony rules for each connection option. Those skilled in the art will appreciate that other arrangements are possible as between advertiser rules.

Figure 5B:
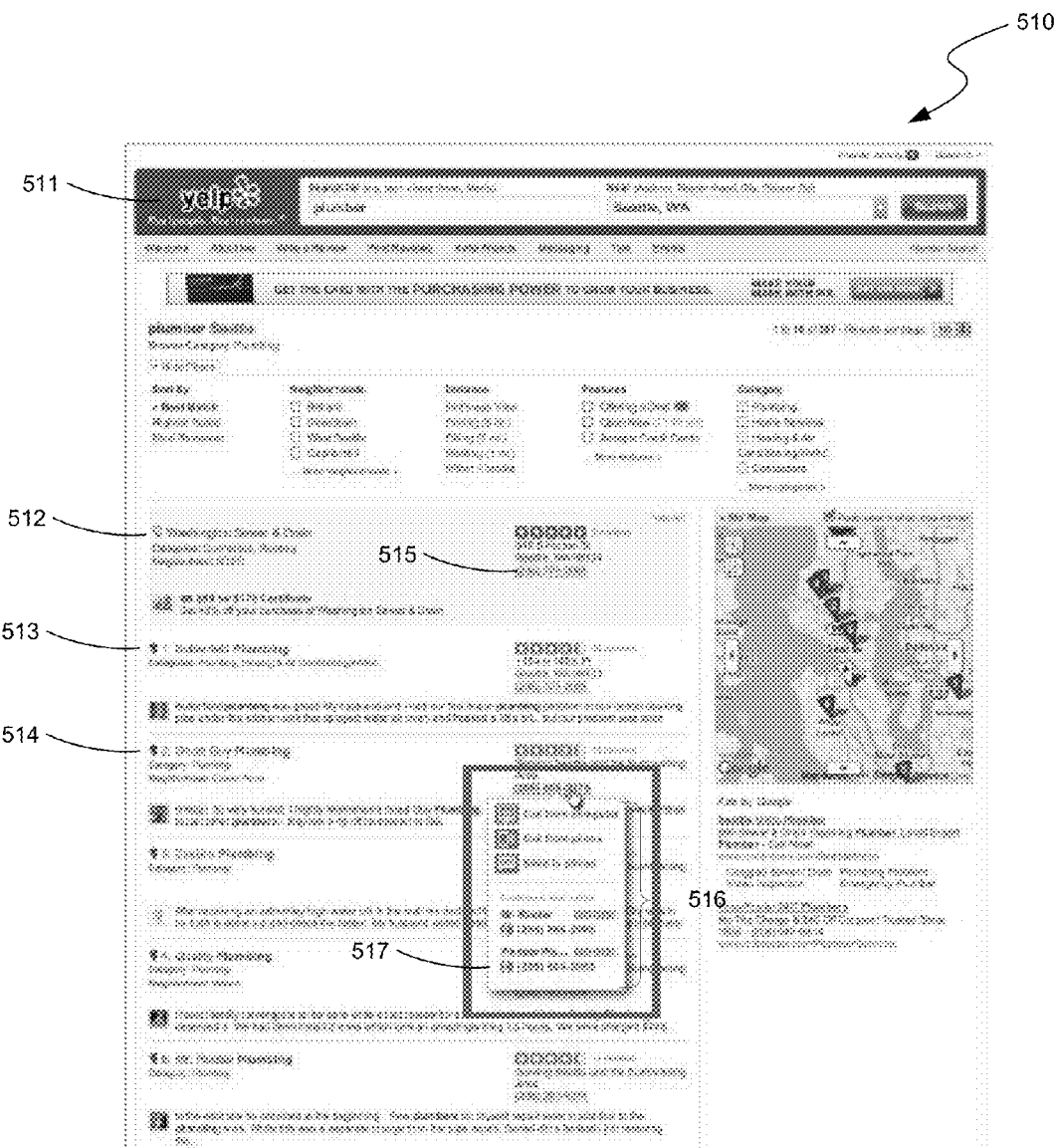
FIG. 5B illustrates an example multimodal connection interface with a recommendations feature.
Figure 5C:
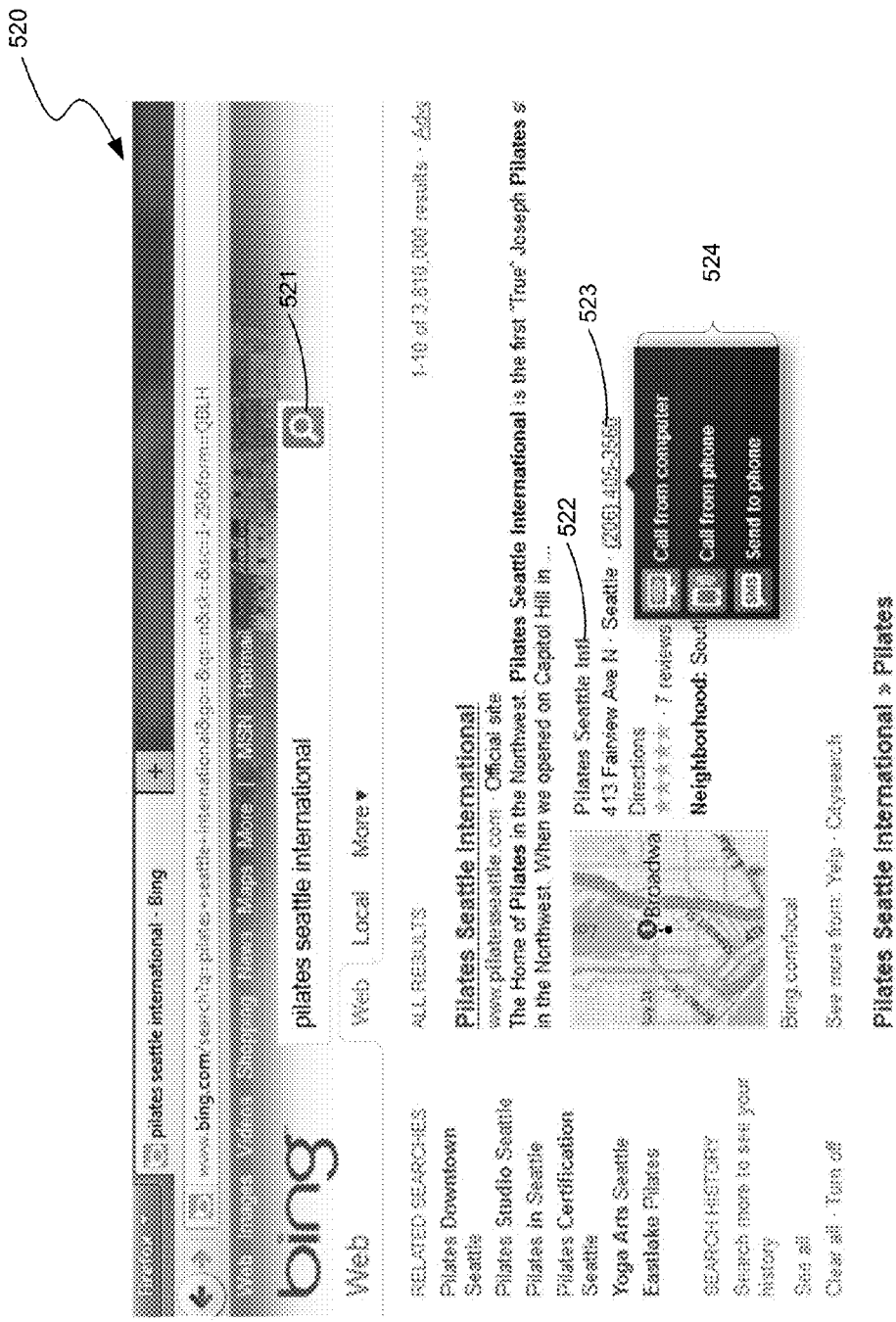
FIG. 5C illustrates an example multimodal connection interface with three connection modes.

FIG. 5B illustrates an example multimodal connection interface 516 on a web page 510 of a server publisher 511 (in the depicted case, Yelp®). The web page 510 displays example search results (e.g., advertisers, select advertisers, unpaid search results) generated in response to a search query for a "plumber" in the Seattle, Wash. area. One search result includes a listing for "Washington Sewer & Drain" 512 with a corresponding telephone number 515 that is highlighted to indicate that additional functionality is available for the telephone number. In this example, the preferred positioning at the top of the search results, the shaded background, and "Yelp Ad" designation signify that the "Washington Sewer & Drain" is a select advertiser for the server publisher. The search results also include a result for "Butterfield Plumbing" 513 and "Good Guy Plumbing" 514, both listings include a telephone number with similar highlighting. In accordance with the system and method described herein, a user wanting to call one of the highlighted numbers can simply click-on or point to the highlighted telephone number to display a multimodal connection interface 516 on the user's electronic device. Moreover, the multimodal connection interface 516 can include additional information 517 such as promotions, hyperlinks, information extracted from a user's social network, or related businesses, as shown under the example heading of "Customers also called:". The multimodal connection interface may not be displayed, however, for search results that are not selected advertisers of the publisher.

FIG. 5C illustrates an example multimodal connection interface 524 in an example web page 520 of a server publisher (i.e., www.Bing.com®), which is displayed in a web browser of a client publisher (i.e., Firefox®). In such an instance, there may be both server publisher rules and the client publisher rules, each defining rules to customize the appearance of the multimodal connection interface 524. As previously described, a predetermined analysis scheme can be applied to arbitrate the priority between the rules and ultimately, the way information is presented to users on the multimodal connection interface. In FIG. 5C, the web page displays search results that were generated in response to a search query 521 for "pilates seattle international." One listing that resulted from the search is a business called "Pilates Seattle International" 522, which includes a telephone number 523 and highlighting (i.e., underlining, different color) that indicates that additional functionality is available for the displayed telephone number 523. In accordance with the system and method described herein, a user wanting to contact the highlighted telephone number can simply click-on or point to the telephone number 523, initiating the display of a multimodal connection interface 524 to the user on an electronic device. The example multimodal connection interface 524 presents the user an option to call the telephone number from a computer, from a phone, or to send information via a text message to a phone.

Returning to the flow diagram of FIG. 4, FIG. 4B is a flow diagram illustrating a process 450 by which the system defines connection parameters. After a multimodal connection interface is displayed to the user of the electronic device, the electronic device at block 451 detects any user interaction with the multimodal connection interface. As known in the art, a user can interact with a GUI interface via an input device such as a mouse, a touch pad, a touch screen, a cursor, voice command, etc. The electronic device waits to detect that the user has interacted with an enabled telephone number. An example user interaction is a GUI event of selecting the telephone number. The user interaction may be triggered by, for example, depressing a left-hand or a right-hand button on a computer mouse, or tapping on a touch screen. Another example user interaction includes moving to, hovering, or pointing an indicator in a designated area of a GUI. Those skilled in the art will appreciate that other possible indications may be registered to detect user interaction.

As previously discussed in FIGS. 5A-5C, the multimodal connection interface presents to a user the option of establishing a communication session such as a voice call or a text message with the advertiser via a plurality of connection mechanisms. For example, the multimodal connection interface may offer choices such as "call from computer," "call from phone," "send to phone," as well as time-shifted variations such as "call now" or "call later" via selected connection mechanism. In one embodiment, the interface includes an input region wherein a user can manually input a telephone number at which the user can be reached. In another embodiment, the telephone number of the user is already known to the system (e.g., via a user profile maintained by the system and correlated with a user identifier) such that the electronic device has the necessary contact information to establish a communication session between the user and advertiser.

At block 452, the electronic device transmits the user selection of a connection mechanism to the multimodal connection interface system 170. At block 453, the system receives the user selection a connection mechanism. In addition to the user selection of a connection mechanism, contextual information may also be transmitted/received, such as information identifying the user, a location of the user, and a previous calling history associated with the user. Contextual information may be used by the system 170 to analyze the effectiveness of the advertisement associated with the telephone number. For example, the system may identify the type of publisher and the search queries which lead the user to contact the telephone number. In some cases, a session token including information identifying the selected connection mechanism, the advertiser telephone number, and other details may be transmitted/received. In the case where the user manually enters a telephone number, information identifying the telephone number entered by the user may also be transmitted/received.

At block 454, the system determines telephony rules. The system may, for example, access the telephony rules dataset 455 to look-up telephony rules. As previously discussed, telephony rules can be defined by an advertiser, publisher, or administrator and specify the various functions and features of the communication between the advertiser and the user or what should be done when the connection is made. The telephony rules may define how to configure a communication session based on the selected connection mechanism. For voice calls, telephony rules may direct the system to, for example, connect to an IVR system, insert a call whisper, connect a call for free, record the call, bill a certain entity for the connection. For a communication session via text message or email, etc., telephony rules can direct the system to perform other features and functionalities such as send information about the advertiser (e.g., address, hours, directions) to the user.

At block 456, the system applies the determined telephony rules to define the connection parameters of the communication session. The telephony rules specify the various functions and features of the communication session between the advertiser and user. Based on the telephony rules, the connection parameters configure how the connection to the advertiser telephone number is made. For example, to enable multimedia calls between a web browser and a telephone number, an interface (or gateway) is needed that interoperates between a client-side API and standard VoIP user agents. The interface can be based on SIP or any related protocol. The communications component in the processing module performs the necessary operations to enable the gateway, while the connection parameters configure aspects of the connection such as how the VoIP connection is routed.

At block 457, the system establishes a communication session via the selected connection mechanism. A communication session may be established by a communications component in the processing module of the multimodal connection interface system. Those skilled in the art will appreciate that the communications component can institute a communication session through an Internet Protocol (IP) network, a cellular telecommunication network supporting SMS functionality, a public switched telephone network (PSTN), any combination of these networks, or any other suitable network that can support real-time communication capabilities (e.g., video conferencing, instance messaging).

In one embodiment, a communication session with an advertiser may be established via an IP network. A user may initiate a communication session such as a voice call or a video conference to an advertiser from a variety of electronic devices such as a computer (e.g., laptop, desktop), an IP telephone, or a mobile telephone equipped with IP capabilities. In preparation for a VoIP transmission, a communication component on the electronic device may, for example, package audio and video information in discrete packets and append additional information such as a user identifier, the user's location (e.g., the geographical location, the location of the network accessed by the user), the caller phone number, the context in which the telephone number was presented (e.g., contents of web page), and other details. The multimodal connection interface system may connect or route the communication session initiated by a user of the electronic device with the advertiser telephone number.

In another embodiment, a communication session with an advertiser may be established via a telephone network such as a PSTN and/or a cellular telecommunications network. A user may request a communication session with the advertiser, such as a voice call, a video conference, a text message, etc. The user may initiate the communication session from a variety of electronic devices such as a mobile telephone, a smart phone, a computer (e.g., laptop, desktop), a PDA, etc. For example, the electronic device may automatically dial a phone number when a user simply selects (e.g., click, tap) the telephone number displayed on a web page. The electronic device may, for example, utilize a Short Message Service (SMS) to transmit/receive text messages to/from an advertiser.

The multimodal connection interface system may assist in the connection or routing of the communication session via PSTN and/or cellular telecommunications network. For example, the multimodal connection interface system may make a call to the user and a separate call to the advertiser telephone number and bridge, or conference, the calls to connect the user and the advertiser. The separate calls may be made over a PSTN or a cellular telecommunications network. As another example, the system may forward a call from the user to the advertiser. When an advertiser sends a text message to the user, the multimodal connection interface system may facilitate the use of a Call Tracking Number for the connection.

Figure 6A:
FIG. 6A illustrates an example user interface generated after a user indicates a desire to initiate a communication session with a computer.

FIG. 6A illustrates an example user interface generated after a user indicates a desire to initiate a communication session via an IP network. In this instance, the multimodal connection interface 602 in FIG. 6A presents the opportunity to make a voice call to the "(206) 405-3560" telephone number 601 via VoIP by displaying to the user the option to "call from computer." When a user chooses the "call from computer" selection 603, an interface that displays the connection status appears. As shown in FIG. 6A, the interface displays the target telephone number 604 to be reached as well as an indication 605 showing the progress of establishing a communication session via a VoIP network.

Figure 6B:
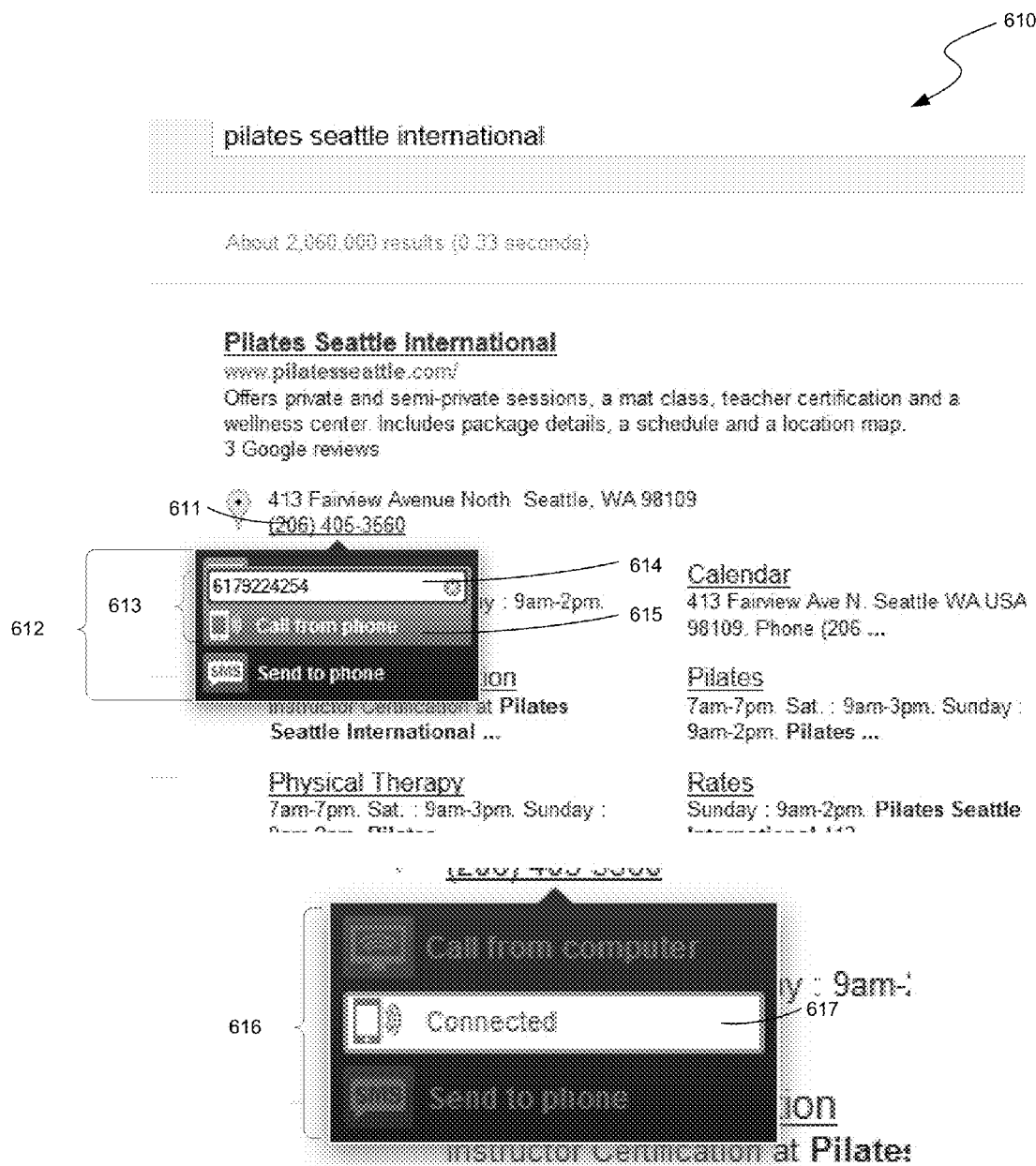
FIG. 6B illustrates example user interfaces generated after a user indicates a desire to initiate a voice communication session with a phone.

FIG. 6B illustrates example user interfaces generated after a user indicates a desire to initiate a voice communication session via a PSTN or cellular telecommunications network, in some embodiments. In this instance, the multimodal connection interface 612 in FIG. 6B presents the opportunity to make a voice call to the "(206) 405-3560" telephone number 611 via a telephone network by displaying to the user the option to "Call from phone." When a user chooses the "call from phone" selection 615, an optional input region 614 appended to the modified multimodal connection interface 613 appears, in which the user's contact information can be entered. Upon entering the telephone number a voice call can be received, the user can commence the process of establishing a voice call by hitting "enter" or selecting the "call from phone" option 615 again. The voice communication session may be established via a PSTN network or a telecommunications network through, for example, call conferencing. The modified multimodal connection interface 616 displays the status of the connection with an indication 617 that phone is "connected" to the telephone number.

Figure 6C:
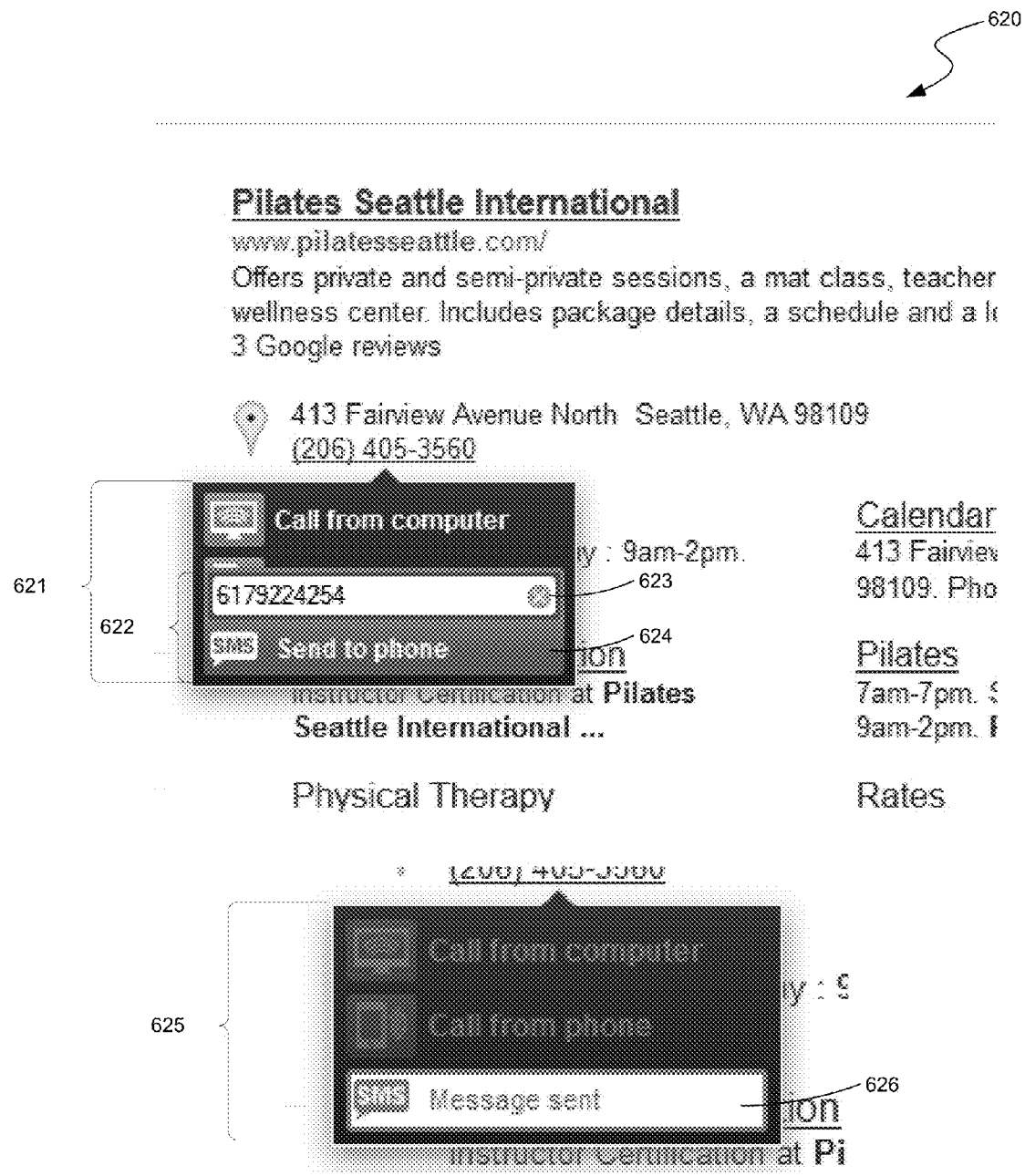
FIG. 6C illustrates example user interfaces generated after a user indicates a desire to initiate a communication session via a text message to a phone.

FIG. 6C illustrates example user interfaces generated after a user indicates a desire to initiate a communication session via text message. In this instance, the multimodal connection interface 621 presents the opportunity to have a text message sent from the advertiser at the "(206) 405-3560" telephone number via an SMS channel of a cellular telecommunications network. FIG. 6C shows an example option displayed to the user to "send to phone." When a user chooses the "send to phone" selection 624, an optional input region 623 appended to a modified multimodal connection interface 622 appears in which the user's contact information can be entered. Upon entering the telephone number where a text message can be sent, the user can commence the process of sending a text message by hitting "enter" or selecting the "send to phone" option 624 again. The telephony rules of the multimodal connection interface system specify the contents of the text message and determine what text message contents are actionable on the electronic device. After the communication session is complete, the modified multimodal connection interface 625 displays the status of the connection with an indication 626 that a text message has been sent.

Figure 6D:
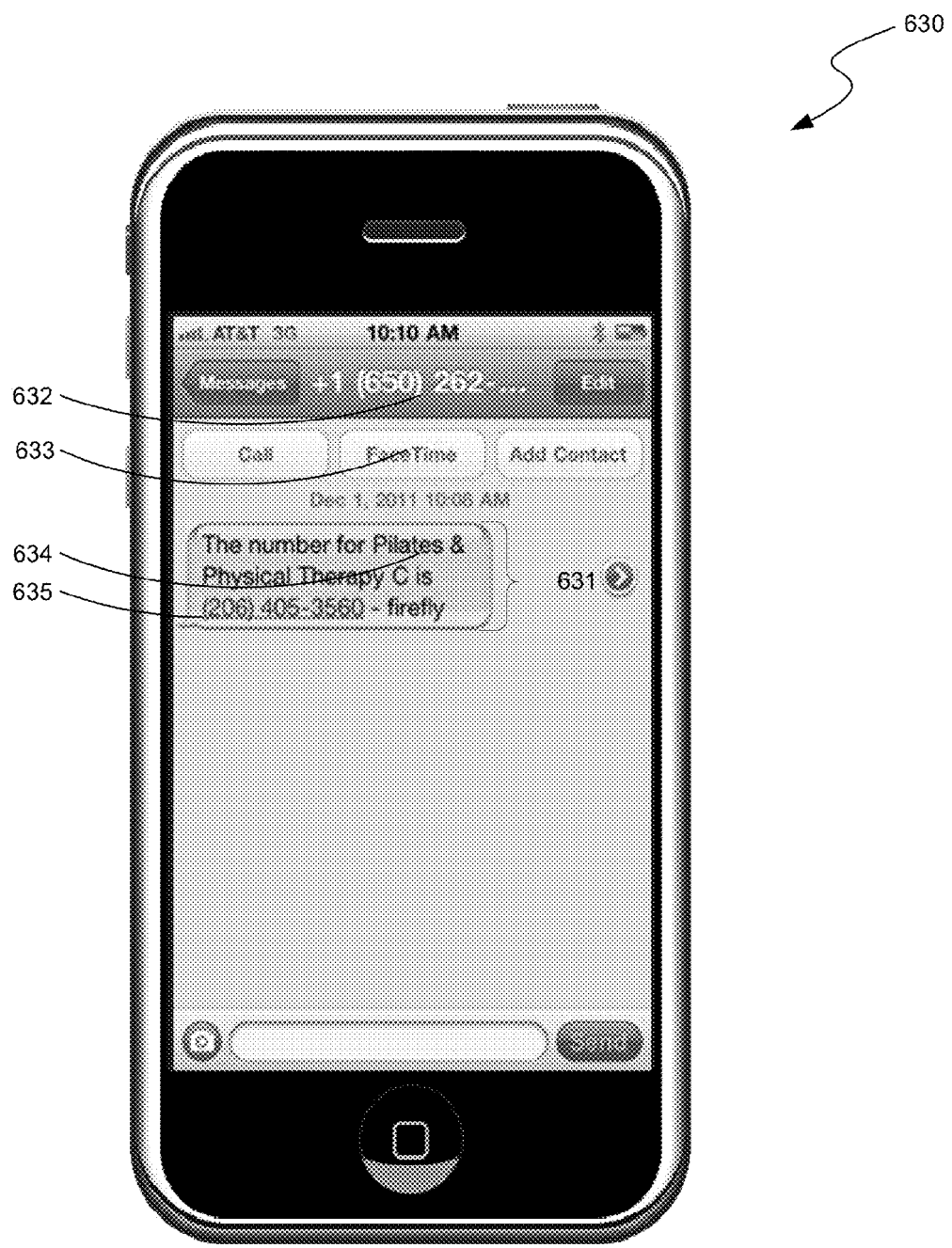
FIG. 6D illustrates an example text message (e.g., SMS) received on a user's phone.

FIG. 6D illustrates an example text message 631 (e.g., SMS) received on a user device in some embodiments. The electronic device 630 displays a text message 631 received via SMS and initiated by the selection of the "send to phone" option on the multimodal connection interface. As shown in FIG. 6D, the text message 631 originates from a telephone number 632 (e.g., a call tracking number) that is different from the telephone number displayed in the electronic content. The contents of the text message 631 include the name of the advertiser/business 634 (i.e., "Pilates & Physical Therapy C") and a highlighted telephone number 635 such that when a user interacts with the highlighted telephone number 635, the electronic device dials the telephone number for the user. The text message can include additional information such as a physical address, business hours, email, appointment availability, social networking activity, and other information, any of which can be highlighted to indicate that additional functionality is available. The telephony rules can also specify the support of additional features, such as initiating a video conference 633 with the advertiser.

From the foregoing, it will be appreciated that specific embodiments of the invention have been described herein for purposes of illustration, but that various modifications may be made without deviating from the spirit and scope of the invention. For example, the system can be implemented in distributed computing environments, where tasks or modules are performed by remote processing devices, which are linked through a communications network, such as a Local Area Network (LAN), Wide Area Network (WAN), or the Internet. In a distributed computing environment, program modules or sub-routines may be located in both local and remote memory storage devices, and portions of the invention may reside on a server computer while other portions reside on a client computer.

Aspects of the system described herein may be stored or distributed as instructions on computer-readable media, including magnetic- and optically-readable and removable computer discs, stored as firmware in chips (e.g., EEPROM chips), or other storage media, and suitable for execution on one or more processors. Those skilled in the art will appreciate that the actual implementation of the data storage area may take a variety of forms, and the phrase "data storage area" is used herein in the generic sense to refer to any area that allows data to be stored in a structured and accessible fashion using such applications or constructs as databases, tables, linked lists, arrays, and so on.

Those skilled in the art will appreciate that the depicted flow charts may be altered in a variety of ways. For example, the order of the blocks may be rearranged, blocks may be performed in parallel, blocks may be omitted, or other blocks may be included.

CONCLUSION

The above detailed description of examples of the technology is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

I claim:

1. A system to configure a connection interface that allows selection of a communication channel to a telephone number displayed on a web page, the system receiving data from multiple electronic devices, the system comprising:
   a data storage area to store a plurality of telephone numbers, wherein at least some of the plurality of telephone numbers are associated with an advertiser rule;
   a connection interface module coupled to the data storage area, the connection interface module configured to:
      receive information related to a telephone number in a web page that is displayed on an electronic device, wherein the information includes the telephone number and contextual data about the web page;
      using the received telephone number, identify, in the data storage area, the advertiser rule associated with the telephone number;
      determine a set of interface parameters based on the advertiser rule and the contextual data, wherein the set of interface parameters configure how a connection interface offering multiple communication channels is to be displayed on the web page; and
      transmit the set of interface parameters to the electronic device to enable the connection interface to be displayed in accordance with the interface parameters, wherein the connection interface presents a plurality of communication channels through which the electronic device can be communicatively coupled to the telephone number.

2. The system of claim 1, wherein the connection interface module is further configured to verify that the telephone number displayed in the web page on the electronic device is a member of the set of telephone numbers for which a connection interface is to be displayed.

3. The system of claim 1, wherein the contextual data about the web page includes an identifier of the web page.

4. The system of claim 1, wherein at least some of the plurality of telephone numbers in the data storage area are associated with a publisher rule.

5. The system of claim 4, wherein at least some of the plurality of telephone numbers have both an associated advertiser rule and a publisher rule.

6. The system of claim 4, wherein the connection interface module is further configured to:
   using the received telephone number, identify, in the data storage area, the publisher rule associated with the telephone number; and
   resolve any conflict of the advertiser rule and the publisher rule using a predetermined analysis scheme.

7. The system of claim 1, wherein the connection interface module is further configured to:
   track the received information to develop metrics by correlating the received telephone number and contextual data across the multiple electronic devices.

8. A method for creating a customized connection interface that presents two or more ways in which a user can connect to an advertiser's telephone number displayed in electronic content, the method comprising:
   receiving information corresponding to an advertiser's telephone number displayed in electronic content on a user device, wherein the information includes a telephone number and contextual data about the electronic content;
   identifying a rule based on the telephone number or the contextual data, wherein the rule specifies two or more connection mechanisms through which the user can connect to the advertiser's telephone number;
   generating a set of interface parameters based on the rule, wherein the set of interface parameters are configured to define a multimodal connection interface within the electronic content; and
   transmitting the set of interface parameters to the user device to enable the multimodal connection interface to be displayed, wherein the multimodal connection interface presents the two or more connection mechanisms in accordance to the set of interface parameters, and wherein the multimodal connection interface enables the user to connect to the advertiser's telephone number via one of the two or more connection mechanisms.

9. The method of claim 8, wherein the rule further includes instructions from an advertiser that specifies how the multimodal connection interface is to be visually rendered.

10. The method of claim 9, wherein the rule further includes instructions from a publisher that specifies how the multimodal connection interface is to be visually rendered, and further comprising resolving any conflict between the advertiser instructions and the publisher instructions with a predetermined scheme.

11. The method of claim 8, wherein the rule further includes instructions from an advertiser that define a first set of information that is presented to the user in the multimodal connection interface.

12. The method of claim 11, wherein the first set of information includes at least one of the following: business hours, a geographic location, directions, a promotion, a rating, a review, or social networking activity.

13. The method of claim 8, wherein the rule further includes instructions from a publisher that define a second set of information that is presented to the user in the multimodal connection interface.

14. The method of claim 13, wherein the second set of information includes a second advertiser and a second advertiser's telephone number.

15. The method of claim 8, wherein the multimodal connection interface further enables the user to specify when the user connects to the advertiser's telephone number via one of the two or more connection mechanisms.

16. A method of presenting a multimodal connection interface to a telephone number within electronic content displayed by an electronic device, the method comprising:
   detecting that electronic content displayed by the electronic device includes a telephone number associated with an advertiser, the telephone number having a multimodal connection interface that is to be displayed to enable a user of the electronic device to contact the advertiser;
   detecting user interaction with the telephone number, wherein the user interaction includes a Graphical User Interface (GUI) event of pointing an indicator to the enabled telephone number or selecting the enabled telephone number;
   transmitting data corresponding to the telephone number, wherein the data includes the telephone number and contextual data about the electronic content;
   receiving configuration data characterizing a multimodal connection interface that is to be displayed in association with the telephone number; and
   displaying the multimodal connection interface in association with the enabled telephone number, wherein the multimodal connection interface presents a plurality of connection modes based on the received configuration data, and wherein the multimodal connection interface communicatively couples the electronic device to the advertiser via one of the plurality of connection modes.

17. The method of claim 16, wherein the received configuration data specifies how the multimodal connection interface is visually rendered.

18. The method of claim 16, wherein the received configuration data specifies each of the plurality of connection modes through which the multimodal connection interface communicatively couples the electronic device to the advertiser.

19. The method of claim 16, wherein the multimodal connection interface further displays at least one of the following: business hours, geographic location, directions, promotion, rating, review, or social networking activity.

20. The method of claim 16, wherein the multimodal connection interface further displays a related advertiser's telephone number.

21. The method of claim 16, wherein the multimodal connection interface further enables the user to specify when the electronic device is communicatively coupled to the advertiser via one of the plurality of connection modes.

* * * * *